July 7, 1931.  G. LASKER  1,813,058

BOILER

Filed Aug. 29, 1929  6 Sheets-Sheet 1

Witness:
William P. Kilroy

Inventor:
George Lasker
By Hel & Hill
Attys

July 7, 1931.   G. LASKER   1,813,058
BOILER
Filed Aug. 29, 1929   6 Sheets-Sheet 2

Witness:
William P. Kilroy

Inventor:
George Lasker

July 7, 1931. G. LASKER 1,813,058
BOILER
Filed Aug. 29, 1929 6 Sheets-Sheet 6

Witness:
William P. Riley

Inventor:
George Lasker
By H. H. Hill
Attys

Patented July 7, 1931

1,813,058

UNITED STATES PATENT OFFICE

GEORGE LASKER, OF CHICAGO, ILLINOIS

BOILER

Application filed August 29, 1929. Serial No. 389,190.

My invention relates to boilers and more particularly it relates to water tube boilers in combination with down draft furnaces, wherein the boiler comprises a plurality of drums interconnected by a system of pipes and tubes so arranged that separation of the steam from the water as rapidly as it is generated is accomplished by gravity. Efficient operation of a boiler of this type requires that the unevaporated water be recirculated and again subjected to the furnace heat and that the steam as it is generated be prevented from recirculating and be caused to travel upwardly to a storage drum or the like through take off tubes suitably provided for that purpose.

One of the objects of the invention is the provision in a boiler of improved means operable to utilize gravity in separating unevaporated water from steam, whereby the water is caused to recirculate and the steam is suitably separated from the boiler water and prevented from recirculating therewith.

The invention contemplates a vertically elongated down draft combustion chamber having its inner side walls lined with tubes to form a water cooled wall, the lengths of the portions of the tubes so exposed to the furnace heat, as well as their spacing, being proportionately varied in accordance with the temperature and rate of combustion in that particular zone; and another object is to produce an arrangement and spacing of boiler tubes which results in suitably cooling the walls of the furnace in accordance with the temperatures of the particular adjoining zone.

A further object of the invention is to provide a system of pipes so arranged that the furnace wall is water cooled regardless of the size or shape of the furnace.

Still another object of the invention is the provision of an improved arrangement of systems of tubes which interconnect a plurality of drums whereby the tubes are so exposed to the furnace heat that evaporation of the water is economically effected.

A still further object of the invention is the provision of an improved down draft furnace having its burning zone in the top of the combustion chamber and an incandescent or zone of maximum temperature in the mid portion of the chamber, thereby utilizing the principle of moving the heavier gases in a downward direction and replacing them by the hotter gases of the upper zone in combination with an arrangement of tubes in the side walls which are alternately intermittent and continuous to provide a spacing in accordance with the temperatures of the adjacent zones.

Many other objects and advantages of the construction herein shown and described will be obvious to those skilled in the art from the description herein given. To this end my invention consists in the novel construction, arrangement and combination of parts herein shown and described, and more particularly pointed out in the claims.

In the drawings, wherein like reference characters indicate like or corresponding parts;

Figure 1:
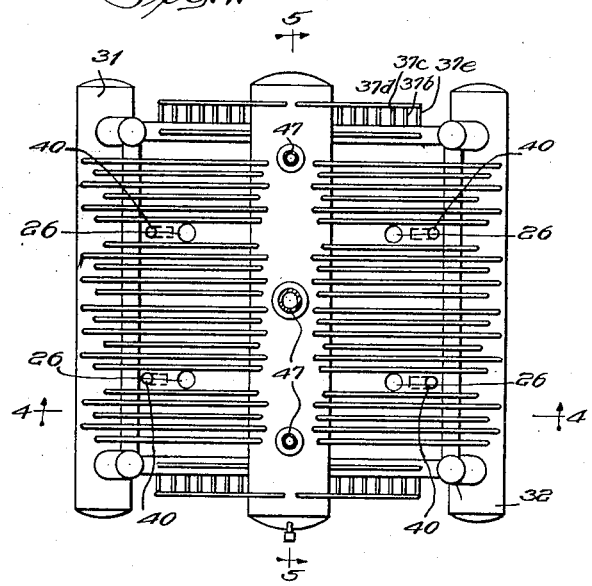
Fig. 1 is a top plan view of a preferred form of boiler construction embodying the principles of my invention.

Referring now to the drawings, I have provided a furnace or combustion chamber 10 which is preferably of rectangular cross section and is shown as having much greater depth or length than either its width or length. The furnace 10 is enclosed by side walls 11, 12, 13, and 14, a roof 15 and sloping bottom walls 16 and 17. The walls, roof, and bottom of the furnace are all constructed of any suitable fire resisting material. In the roof 15 are a plurality of intake pipes 26, through which air powdered coal, gas or any suitable fuel may be fed into the furnace. The sloping bottom wall 17 stops short of the mid portion of the furnace to provide a passageway 27 for the gases and other products of combustion travelling from the combustion chamber 10 into a quiet chamber 23 which is positioned below the combustion chamber. The quiet chamber 23 is enclosed by oppositely positioned vertical end walls 24 and side walls 25. The heavier cooling gases after emerging from the passageway 27, pass underneath a drum 33 and up between the baffle-plate 18 and the sloping wall 16 from which they escape through an opening 19 discharging into a flue or a chimney (not shown).

Sufficient air is admitted with the fuel through the pipes 26 to meet the combustion demands for ordinary operation of a boiler and to meet the initial demands for intensified combustion. More intense combustion is accomplished by feeding air under pressure through horizontal tubes 40. The tubes 40 are so positioned as to discharge adjacent the pipes 26, thereby merging the air discharging therefrom with the downwardly travelling fuel and gases coming from the pipes. The air under pressure unites with the initial gases of combustion and the mixture is caused to descend and whirl about the outer walls of the furnace, forming a vortex as they descend, with the result that an incandescent or high temperature zone is formed in the furnace 10.

The zone of maximum temperature is located substantially midway between the upper and lower ends of the furnace 10. Since the draft is downward, the invention utilizes the principle of moving the heavier gases in a downward direction and displacing them with the hotter gases of the upper zone. The lower portion of the furnace provides a zone of lower temperature than that of the middle zone. The quiet chamber 23 provides a receptacle for the precipitation of dust and fine particles of ash before the gases leave the furnace through the outlet 19 leading from the chamber 23 to the flue.

The drum 33 is positioned near the center of the quiet chamber 23 and is connected to a pair of oppositely positioned drums 31 and 32 by a plurality of tubes 34. The chamber 23 provides a two pass boiler zone through which the gases pass at a sufficiently low velocity to permit the heat to be effectively abstracted from the flying ash carried by the gases, followed by natural precipitation of the ash before the cooled gases have escaped through the outlet 19. The drum 33 projects through and is supported by the end walls 24 of the quiet chamber 23. The drums 31 and 32 are positioned on the top of the side walls 25 of the quiet chamber 23 and are connected by a pair of horizontally extending pipes 35a positioned one at each end of the drums.

Four vertical pipes or columns 38 are positioned one at each corner of the furnace or combustion chamber 10. The pipes 38 are supported by the drums 31 and 32 and extend upwardly on the outside of and substantially to the top of the furnace 10. The stand-pipes or columns 38 are connected in pairs by a plurality of horizontal pipes 36a, 36b, 36c, and 36d, which are parallel to the drums 31 and 32. The stand-pipes 38 are also connected in pairs by a plurality of horizontal pipes extending transversely to the direction of the drums 31 and 32, the pipes being numbered 35b, 35c, 35d, and 35e, respectively. Thus the four stand-pipes 38, which are positioned on the outside of the furnace, and one at each corner thereof, are each connected with two others of the stand-pipes by four horizontally extending pipes, the stand-pipes and horizontal pipes together forming an interconnected system of steam and water conduits surrounding the combustion chamber 10.

The drum 30, which is positioned at the top of the combustion chamber 10 is connected with the horizontal pipes 35 by a plurality of tubes 37 which project radially from the ends of the drum and turn downwardly. The lower ends of the tubes 37 are connected with the pipes 35b, 35c, 35d, and 35e.

The tubes 37 which connect the ends of the drum 30 with the horizontal pipes 35 are arranged in groups in accordance with their terminal connections, each pipe of a group being given the same numeral and subscript as all other pipes of the group. Tubes 37b connect the pipes 35b with the end of the drum 30. Tubes 37c connect the horizontal pipes 35c with the drum 30. The tubes 37d similarly connect the pipes 35d with the drum 30 and the pipes 37e likewise connect the upper pipe 35e with the drum.

The drum 30 is also connected with the horizontal pipes 36 by a plurality of tubes 39, some of which connect the drum with the pipes 36a, others with the pipes 36b, and still others with the pipes 36c. The tubes 39 which connect the pipes 36a with the drum 30 are given the subscript "a". The tubes 39 which connect the pipes 36b with the drum 30 are given the subscript "b". Similarly, the tubes 39 connecting the pipes 36c with the drum 30 are given the subscript "c".

The interior vertically extending tubes which line the side walls 11 and 13 are given the general number 51 with suitable subscripts indicating their position. The tubes 51 which connect the drums 31 and 32 with the corresponding horizontal pipes 35a are given the subscript "a". The tubes 51 connecting the drums 31 and 32 with the corresponding horizontal pipes 36b have the subscript "b", and the tubes 51 connecting the pipes 36a with the pipes 36c are given the subscript "c". The tubes 51 which connect the horizontal pipe 36b with the horizontal pipes 36d have the subscript "d" and the tubes 51 connecting the horizontal pipe 36c with the drum 30 are given the subscript "e". The tubes connecting the horizontal pipe 36d with the drum 30 are marked as 51f.

The interior vertical tubes which line the opposite side walls 12 and 14 of the combustion chamber 10 are designated by the numeral 52 with suitable subscripts indicating their position and the particular pipes or drums which they connect. The tubes 52 which connect the pipes 35a with the corresponding horizontal pipe 35c are given the subscript "a". The tubes 52 which connect the horizontal pipes 35b with the horizontal pipes 35d have the subscript "b". The tubes 52 which connect the pipes 35c with the pipes 35e are given the subscript "c" and such tubes 52 as connect the pipes 35e with the drum 30 have the subscript "d".

By placing the tubes 51 and 52 in the side walls of the furnace in both continuous and intermittent relation with the close spacing arranged in that portion of the furnace bounding the incandescent zone and the wider or intermittent spacings in the relatively cool portions of the furnace, a maximum transfer of heat from each zone of the furnace to the surrounding pipes results. The close spacing of the pipes in the incandescent zone and the wider spacings in the cooler zones keep the furnace walls properly cooled.

A plurality of tubes 39a, 39b, and 39c similarly connect the drum 30 with the pipes 36a, 36b, 36c, and 36d, in accordance with an arrangement hereinafter more particularly described. The tubes 37 and 39 provide means for conveying steam from the pipes 35 and 36 to the drum 30 as rapidly as the steam is generated. A plurality of vertically extending tubes 51 and 52 are positioned in the interior of the combustion chamber 10 about the side walls 11, 12, 13 and 14.

It is obvious that the drums 30, 31, 32 and 33 and horizontal pipes 35 and 36 and the vertical tubes which are positioned, some on the exterior of the furnace walls and some on the interior of the furnace walls are all connected, so as to form a complete boiler system in which the water contained in the interior tubes is subjected to a temperature which changes it to steam, the steam being separated from the water by gravity. The drum 33 which is positioned in the quiet chamber 23 performs the function of an economizer and also as a vessel for the precipitation of impurities, the water contained therein being raised to a moderate degree of temperature by the relatively cool gases which pass over and under the drum on their way to the flue outlet 19. It is obvious that there is a constant interchange of water between the drums 31 and 32 and the drum 33, the newly admitted cool water coming through the drums 32 and flowing by gravity downward to the drum 33.

The interior tubes 51 and 52 project through the side walls of the furnace 10 to form connections, some with alternate adjacent horizontal pipes 35 and 36 and others at one end with one of such pipes and at the other end with one or the other of the drums 30, 31, or 32. The interior tubes 51 and 52 are spaced in accordance with the temperature of the adjoining portion or zone of the furnace, the spacing being closest at the middle or incandescent zone. The spacing of the pipes is thus varied to provide water cooled walls and to most efficiently heat the water and steam contained in the tubes. The generated steam is trapped in the horizontal pipes 35 and 36 and carried upwardly to the drum 30 by the tubes 37 and 39. Water is admitted to the system through drum 32 by a pipe 45 which discharges into an overflow trough 46 located in the drum. The generated steam is discharged from the drum 30 by a plurality of outlet pipes 47.

The temperature of the water increases as it circulates through the tubes 28 and 34 and the interior tubes 51 and 52, whereby some of it is evaporated and escapes as steam from the lower horizontal pipes 35 and 36 through the exterior tubes 37 and 39. Some of the steam is likewise trapped in the middle and upper horizontal pipes 35 and 36 and is similarly conveyed to the drum 33. The interior tubes 51 and 52 are so arranged as to permit a constant separation of the steam from the water by gravity and a circulation of the water through the horizontal pipes and vertical tubes until it is generated into steam and escapes into the drum 30 through the exterior tubes 37 and 39.

Figure 7:
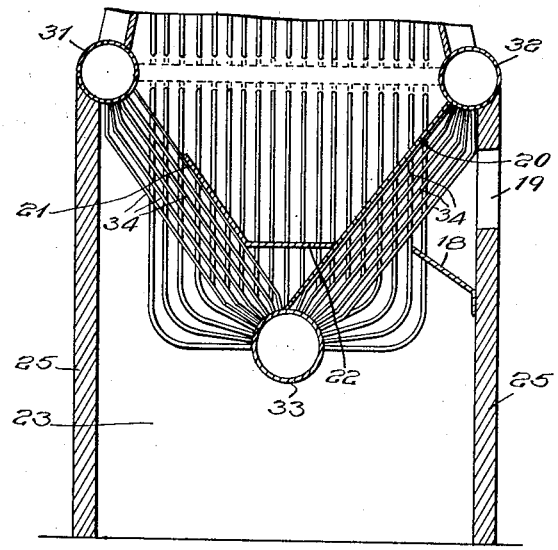
Fig. 7 is a fragmentary vertical sectional view through the lower portion of the boiler and furnace showing details of an alternative form of furnace construction.
Figure 2:
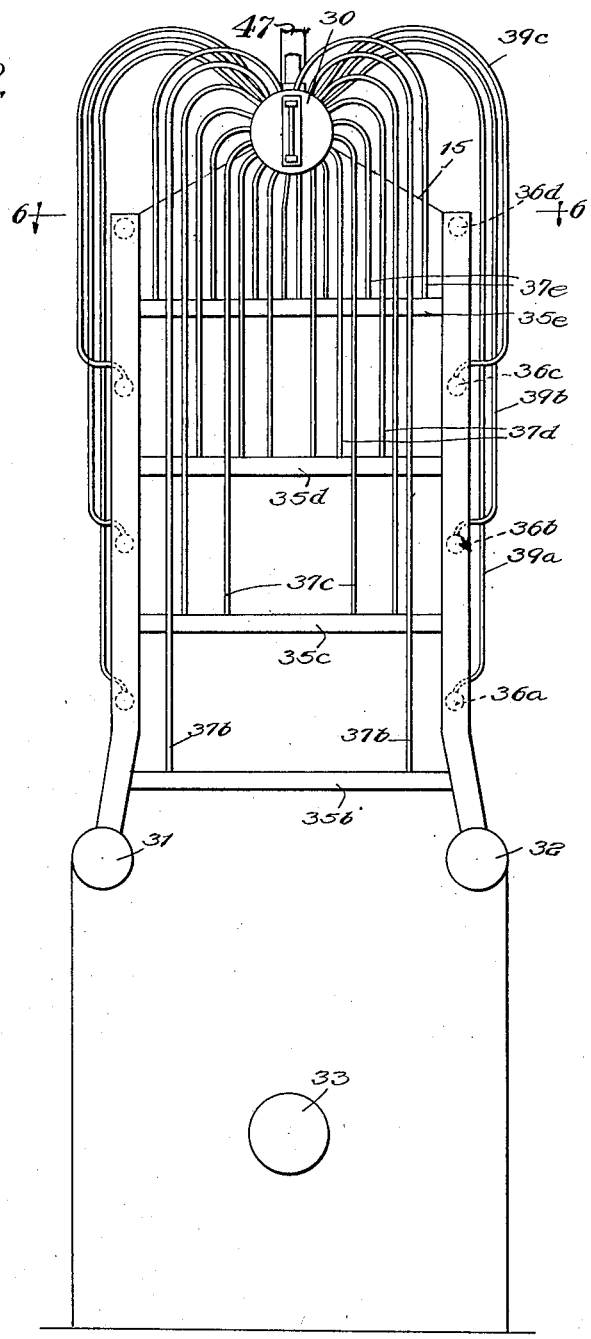
Fig. 2 is an elevational view of the furnace and the exterior portion of the boiler construction, the view being taken along lines transverse to the drums forming a part of the boiler construction.
Figure 3:
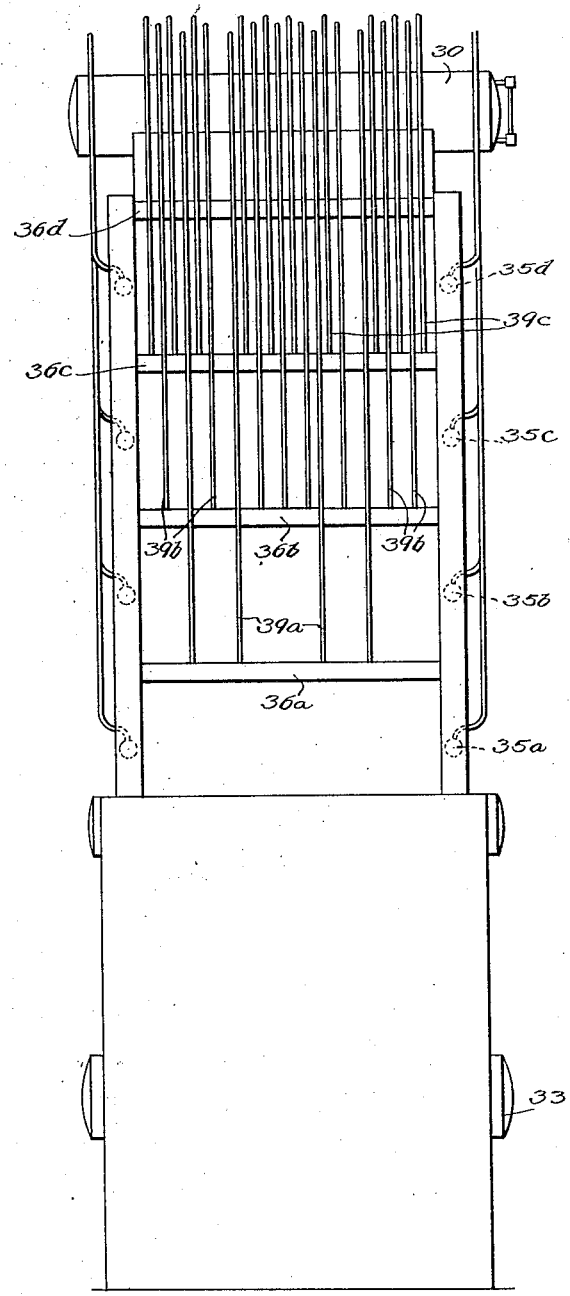
Fig. 3 is an elevational view along a line parallel with the drums.
Figure 4:
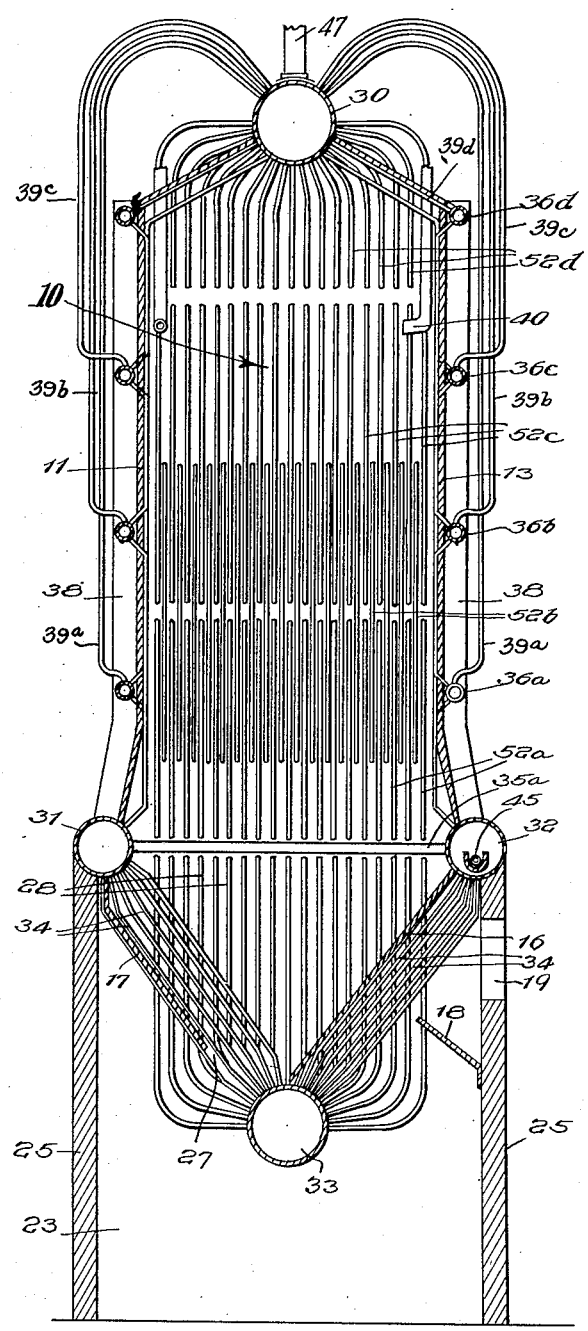
Fig. 4 is a sectional view along the line 4—4 of Fig. 1.
Figure 5:
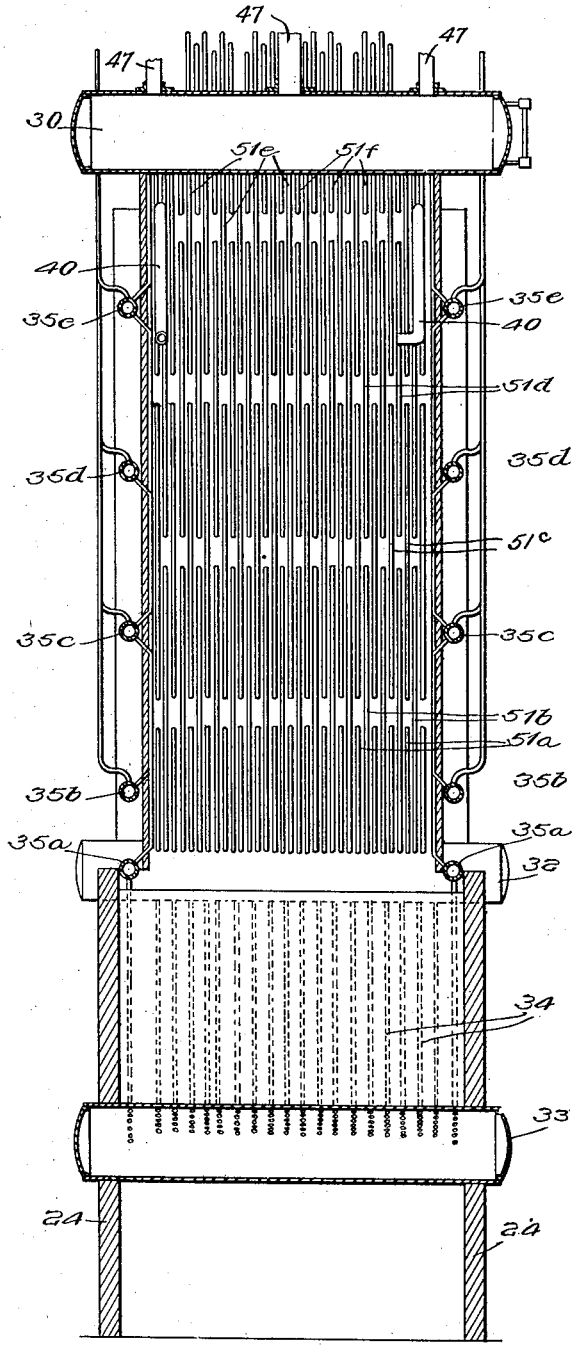
Fig. 5 is a sectional view along the line 5—5 of Fig. 1.
Figure 6:
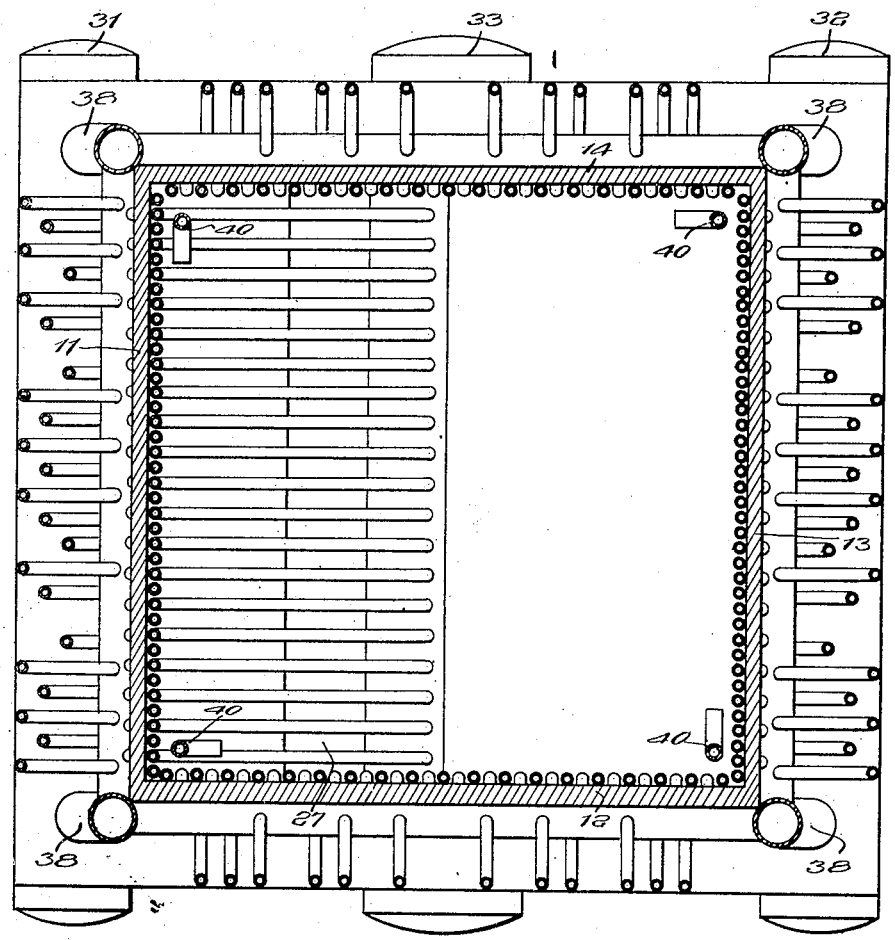
Fig. 6 is a large scale sectional view along the line 6—6 of Fig. 2.

In Fig. 7 an alternative embodiment of the invention is shown which differs from the embodiment already described in the construction of the bottom walls separating the combustion chamber 10 from the quiet chamber 33. The bottom wall comprises a section 20 extending from the drum 32 to the drum 33. The section 21, positioned between the drums 31 and 33 is connected at its lower edge with a horizontal portion 22. The upper edge of the bottom wall section 34 terminates short of the drum 31 thereby providing a passageway for the descending gases to escape from the furnace 10 into the quiet chamber 23. The gases after entering the chamber 23 travel downwardly and transversely under the drum 33 and thence up past the baffle plate 18 escaping through an aperture 19 into a chimney (not shown). In this arrangement of the quiet chamber, the gases travel in close proximity to the floor sections 21, 22, and 23 and thereby come in contact with the downwardly extending tubes 34. The water in the tubes 34 is relatively of lower temperature than the gases that escape into the quiet chamber 23. These gases, as they travel between the tubes 34, transfer a portion of their heat to the tubes. As a result, this arrangement of a floor or a partition between the furnace 10 and the chamber 23 tends to maximum efficiency in exchange of heat from the furnace to the boiler tubes.

Thus it will be seen that I have provided a down draught furnace and boiler in combination, in which the separation of steam and water is accomplished by gravity, the pipes comprising the boiler being arranged in parallel relation with the maximum spacing of the pipes positioned in the middle incandescent zone of the furnace, the spacing of the pipes at the upper and lower ends of the furnace being less than in the middle.

Having thus described my invention, it is obvious that various immaterial modifications may be made in the same without departing from the spirit of my invention; hence I do not wish to be understood as limiting myself to the exact form, construction and arrangement of parts herein shown and described, or uses mentioned.

What I claim as new and desire to secure by Letters Patent is:

1. The combination with a down draft furnace of a boiler construction comprising a plurality of vertical stand-pipes, a system of horizontal pipes and drums connected with the stand-pipes, said stand-pipes and horizontal pipes being positioned outside of the furnace, and a system of vertical tubes positioned about the interior walls of said furnace, said tubes having their ends projecting through the furnace walls and connecting with said horizontal pipes.

2. The combination with a down draft furnace of a boiler construction comprising an upper steam storage tank, a plurality of vertical stand-pipes, a system of horizontal pipes and drums connected with the stand-pipes, each of said stand-pipes being connected at its base with one of said horizontal drums and having a plurality of horizontal pipes connecting it with the adjacent stand-pipes, said horizontal pipes and stand-pipes being positioned on the exterior of the furnace, a plurality of tubes connecting each of said horizontal pipes with said storage tank and a plurality of vertically extending tubes lining the interior walls of the furnace, said vertically extending tubes having their ends projecting through the furnace walls and connected with said horizontal pipes.

3. The combination with a down draft furnace of a boiler construction comprising an upper steam storage tank, a plurality of vertical stand-pipes, a system of horizontal pipes and drums connected with the stand-pipes, each of said stand-pipes being connected at its base with one of said horizontal drums and having a plurality of horizontal pipes connecting it with the adjacent stand-pipes, said horizontal pipes and stand-pipes being positioned on the exterior of the furnace, a plurality of tubes connecting each of said horizontal pipes with said storage tank and a plurality of vertically extending tubes lining the interior walls of the furnace, said vertically extending tubes having their ends projecting through the furnace walls and connected some with alternate horizontal pipes and some at one end with one of said horizontal drums and at the other end with one of said horizontal pipes.

4. The combination with a down draft furnace of a boiler construction comprising an upper steam storage tank, a plurality of vertical stand-pipes, a system of horizontal pipes and drums connected with the stand-pipes, each of said stand-pipes being connected at its base with one of said horizontal drums and having a plurality of horizontal pipes connecting it with the adjacent stand-pipes, said horizontal pipes and stand-pipes being positioned on the exterior of the furnace, a plurality of tubes connecting each of said horizontal pipes with said storage tank and a plurality of vertically extending tubes lining the interior walls of the furnace, said vertically extending tubes having their ends projecting through the furnace walls and connected, some with alternate horizontal pipes and some at one end with one of said horizontal pipes and at the other end with said steam storage tank.

5. The combination with a down draft furnace of a boiler construction comprising an upper steam storage tank, a plurality of vertical stand-pipes, a system of horizontal pipes and drums connected with the stand-pipes, each of said stand-pipes being connected at its base with one of said horizontal drums and having a plurality of horizontal pipes connecting it with the adjacent stand-pipes, said horizontal pipes and stand-pipes being positioned on the exterior of the furnace, a plurality of tubes connecting each of said horizontal pipes with said storage tank and a plurality of vertically extending tubes lining the interior walls of the furnace, said vertically extending tubes having their ends projecting through the furnace walls and connected some at each end with alternate horizontal pipes, others at one end with one of said horizontal drums and at the other end with a horizontal pipe and still others of said vertically extending tubes being connected at one end with one of said horizontal pipes and at the other end with said steam storage tank.

6. The combination with a down draft furnace of a boiler construction comprising an upper steam storage tank, a lower precipitating tank, a plurality of horizontal drums positioned in the furnace walls intermediate said upper and lower tanks, a plurality of vertical stand-pipes connected with said horizontal drums, a plurality of horizontal pipes connecting said stand-pipes, said horizontal pipes and stand-pipes being located on the outside of the furnace and a plurality of vertically extending tubes lining the interior walls of the furnace and interconnecting said storage tank, horizontal pipes, drums and precipitating tank, said tubes having their ends projecting through the furnace walls to connect with said horizontal pipes.

7. The combination with a down draft furnace of a boiler construction comprising an upper steam storage tank, a lower precipitating tank, a plurality of horizontal drums positioned in the furnace walls intermediate said upper and lower tanks, a plurality of vertical stand-pipes connected with said horizontal drums, a plurality of horizontal pipes connecting said stand-pipes, said horizontal pipes and stand-pipes being located on the outside of the furnace and a plurality of vertically extending tubes lining the interior walls of the furnace and interconnecting said storage tank, horizontal pipes and horizontal drums, said tubes being spaced relatively close at the middle zone of the furnace, and further apart in the upper and lower zones.

8. A down draft furnace having rectangular cross section, a pair of drums oppositely positioned in side walls of the furnace, a stand-pipe at each corner of the furnace, said stand-pipes each being mounted on an end of said drums and extending upwardly on the exterior of the furnace, a plurality of spaced apart substantially horizontal pipes positioned on the exterior of each side wall of the furnace and connected at each end with one of said stand-pipes, and a plurality of vertically extending tubes lining each of the interior walls of the furnace and terminating in the horizontal pipes on the exterior of said wall.

9. A down draft furnace having a rectangular cross section, a pair of drums oppositely positioned in side walls of the furnace, a stand-pipe at each corner of the furnace, said stand-pipes each being mounted on an end of said drums and extending upwardly on the exterior of the furnace, a plurality of spaced apart substantially horizontal pipes positioned on the exterior of each side wall of the furnace and connected at each end with one of said stand-pipes, a plurality of vertically extending tubes lining each of the interior walls of the furnace and terminating in the horizontal pipes on the exterior of said wall, and a plurality of tubes connecting said horizontal pipes with said storage tank.

10. The combination with a down draft furnace of a boiler construction comprising an upper steam storage tank, a plurality of vertical stand-pipes, a system of horizontal pipes and drums connected with the stand-pipes, each of said stand-pipes being connected at its base with one of said horizontal drums and having a plurality of said horizontal pipes connecting it with the adjacent stand-pipes, said horizontal pipes and stand-pipes being positioned on the exterior of the furnace, a plurality of tubes connecting each of said horizontal pipes with said storage tank and a plurality of vertically extending tubes lining the interior walls of the furnace, said vertically extending tubes having their ends projecting through the furnace walls and connected with said horizontal pipes, a feed pipe connected with one of said drums and a steam discharge line connected with said storage tank.

11. A down draft furnace having an upper and a lower chamber separated by a plurality of tubes arranged to form a V shaped partition, one side wall of the lower chamber having an outlet opening adjacent said partition, and a system of baffles arranged to direct the gases from the upper chamber into the lower chamber between the tubes forming one side of said partition and into said lower chamber and thence to direct the gases upwardly in contact with the tubes forming the other side of said partition and thence through said outlet opening.

12. A down draft furnace having an upper and a lower chamber separated by a V shaped boiler section, said boiler section comprising a pair of drums mounted in the side walls of the furnace, a third drum between and below said pair of drums, a plurality of tubes connecting said third drum with each of said pair of drums and a system of baffles arranged to direct the downwardly descending gases between the inclined tubes forming one side of said partition and upwardly between the inclined tubes forming the opposite side of said partition.

13. A down draft furnace having an upper and a lower chamber separated by a plurality of tubes arranged to form a V shaped partition, a plurality of vertically extending tubes forming a lining for the side walls of the upper chamber, one side wall of the lower chamber having an outlet opening adjacent said partition, and a system of baffles arranged to direct the gases from the upper chamber into the lower chamber between the tubes forming the side of said partition opposite to said opening and thence to direct the gases upwardly in contact with the tubes forming the other side of said partition and thence through said outlet opening.

14. A down draft furnace having an upper and a lower chamber separated by a plurality of tubes arranged to form a V shaped partition, a plurality of vertically extending tubes forming a lining for the side walls of the upper chamber, a pair of oppositely positioned drums with which said partition tubes are connected at their upper ends, and a middle drum with which said partition tubes are connected at their lower ends, one side wall of the lower chamber having an outlet opening adjacent said partition, and a system of baffles arranged to direct the gases from the upper chamber into the lower chamber between the tubes forming one side of said partition and thence to direct the gases upwardly in contact with the tubes forming the other side of said partition and thence through said outlet opening.

In witness whereof, I hereunto subscribe my name this 27th day of August, A. D. 1929.

GEORGE LASKER.